United States Patent Office 3,681,206
Patented Aug. 1, 1972

3,681,206
TITRATION ELECTROLYTE AND METHOD
Robert R. Austin, Pasadena, and David M. Creighton, Hacienda Heights, Calif., assignors to International Telephone and Telegraph Corporation, New York, N.Y.
No Drawing. Filed Dec. 4, 1970, Ser. No. 95,383
Int. Cl. G01n 27/42
U.S. Cl. 204—1 T    5 Claims

ABSTRACT OF THE DISCLOSURE

A method of measuring the concentration of hydrogen sulfide in natural gas utilizing an electrolyte in a coulometric titrator containing dimethyl sulfoxide to prevent or retard the buildup and adherence of elemental sulfur to the titrator sensing electrode. The buildup prevents accurate or stable titration or reduces the amplitude of the detectable signal. Frequent cleaning of the cell may thus be frequently required for stable operation or a long cell life.

BACKGROUND OF THE INVENTION

This invention relates to the art of measuring chemical concentrations or the like, and more particularly, to an electrolyte for a coulometric titrator, and a method of measuring the concentration of a composition.

One type of coulometric titrator operates on the principle of generation of bromine or iodine in a solution containing iodide or bromide ions by passing electric current through the solution between two platinum electrodes.

Coulometric titration of this type is often applied to measurement of the concentration of hydrogen sulfide in natural gas or atmospheric air. Where bromine is the reagent $H_2S$ is oxidized as follows:

$$H_2S + 4H_2O + 4Br_2 \rightarrow H_2SO_4 + 8HBr$$

Where iodine is the reagent the major portion of the sulfide ion is oxidized to elemental sulfur.

$$H_2S + I_2 = 2HI + S$$

The accumulation of sulfur in the cell electrolyte interfers with the function of the sensing electrode system through which automatic control of the titration is maintained. The elemental sulfur in the form of solid particles adheres to the sensing electrode and prevents accurate or stable titration or reduces the amplitude of the detectable signal. Frequent cleaning may thus be required for stable operation or a long cell life.

SUMMARY OF THE INVENTION

In accordance with the invention, the above-described and other disadvantages of the prior art are overcome by providing an electrolyte in which the solid particles such as the elemental sulfur does not accumulate excessively.

We have discovered an improved electrolyte composition for use in automatic continuous iodine titration of sulfur compounds and particularly in titration of hydrogen sulfide or mixtures containing hydrogen sulfide.

In the coulometric titrator described by Pat. No. 3,448,031 we have discovered that potassium citrate buffered potassium iodide electrolyte solution performance is improved by the addition of up to 4% dimethyl sulfoxide to the aqueous titration solution.

DESCRIPTION OF THE PREFERRED EMBODIMENT

A preferred composition of the electrolyte is as follows:

Per liters of solution:
  32.4 grams $K_3C_6H_5O_7 \cdot H_2O$
  19.0 grams KI (potassium iodide)
  10 grams DMSO (dimethyl sulfoxide)
  $H_2O$ to 1 liter.

We have discovered that this composition can be varied through a range as given below with improved performance of electrolyte over composition outside this range.

5 to 100 grams $K_3C_6H_5O_7 \cdot H_2O$ per liter
5 to 50 grams KI per liter
4 to 40 grams DMSO per liter.

It is to be noted that electrolyte compositions comprising water solution of KI and $K_3C_6H_5O_7 \cdot H_2O$ in concentrations in the range given above have been used in the past few years where $H_2S$ concentrations have been generally below 2 p.p.m. The addition of dimethyl sulfoxide to such electrolyte for use in titrators such as described in Pat. No. 3,448,031 has improved stability of operation and extended cell life between cleaning operations.

The method of the invention may be practiced by operating the apparatus of said patent with said preferred composition of the electrolyte. Thus, $H_2S$ gas would be bubbled through the electrolyte. The dimethyl sulfoxide by itself or synergistically with one or more or all of the other electrolyte ingredients then prevents the formation of excessive elemental sulfur in the cell. The amount of reagent dispensed and the $H_2S$ concentration is then indicated as usual.

The dimethyl sulfoxide may be considered a solvent for the elemental sulfur. However, the word "solvent" as used herein does not exclude a chemical reaction forming a new sulfur compound or a suspension. At any rate, solid sulfur particles do not form as readily in the presence of the dimethyl sulfoxide.

What is claimed is:
1. The method of coulometrically measuring the concentration of at least one constituent of a sample fluid, said method comprising the steps of: passing a sample fluid through a coulometric titrator containing an electrolyte, said fluid tending to cause elemental sulfur to adhere to and to accumulate on at least one electrode of the titrator in the absence of any additive in the electrolyte to retard or to prevent such adherence or accumulation, said electrolyte comprising an aqueous solution containing halogen ions in a quantity sufficient to permit effective sulfur titration, said electrolyte also including a quantity of dimethyl sulfoxide sufficient to effectively suppress or retard said adherence and accumulation, said quantity of dimethyl sulfoxide being sufficiently small to eliminate interference with said effective titration; and indicating the amount of reagent dispensed by said titrator.

2. The invention as defined in claim 1, wherein said electrolyte contains the following amounts of the following compounds:

| Grams per liter of solution— | Compound |
| --- | --- |
| 32.4 | $K_2C_6H_5O_7 \cdot H_2O$ (potassium citrate) |
| 19.0 | KI (potassium iodide). |
| 10.0 | DMSO (dimethyl sulfoxide). |
| $H_2O$ to 1.0 liter. | |

3. The invention as defined in claim 1, wherein said electrolyte contains the following amounts of the following compounds:

Range in grams
per liter of solution—     Compound
5 to 100 _____ $K_3C_6H_5O_7 \cdot H_2O$.
5 to 50 _____ KI.
4 to 40 _____ DMSO.
$H_2O$ to 1.0 liter.

4. A coulometric titrator electrolyte comprising:

Range in grams
per liter of solution—     Compound
5 to 100 _____ $K_3C_6H_5O_7 \cdot H_2O$.
5 to 50 _____ KI.
4 to 40 _____ DMSO.
$H_2O$ to 1.0 liter.

5. The invention as defined in claim 4, wherein said system contains the following amounts of the following compounds:

Grams per liter
of solution—     Compound
32.4 _____ $K_3C_6H_5O_7 \cdot H_2O$ (potassium citrate).
19.0 _____ KI (potassium iodide).
10.0 _____ DMSO (dimethyl sulfoxide).
$H_2O$ to 1.0 liter.

References Cited
UNITED STATES PATENTS

| | | | |
|---|---|---|---|
| 3,131,133 | 4/1964 | Barendrecht | 204—1 T |
| 3,551,554 | 12/1970 | Herschler | 424—7 |
| 2,928,782 | 3/1960 | Leisey | 204—195 T |
| 3,154,477 | 10/1964 | Kesler | 204—1 T |
| 3,162,585 | 12/1964 | Ford et al. | 204—1 T |
| 3,341,430 | 9/1967 | Wickerham et al. | 204—1 T |
| 3,361,661 | 1/1968 | Schulze | 204—195 T |
| 3,448,031 | 6/1969 | Robinson | 204—195 T |

GERALD L. KAPLAN, Primary Examiner

U.S. Cl. X.R.

204—195 T; 252—62.2